Oct. 20, 1925. 1,558,396
R. L. ROEHRS
GRASS SEED CONTAINER
Filed Nov. 8, 1923
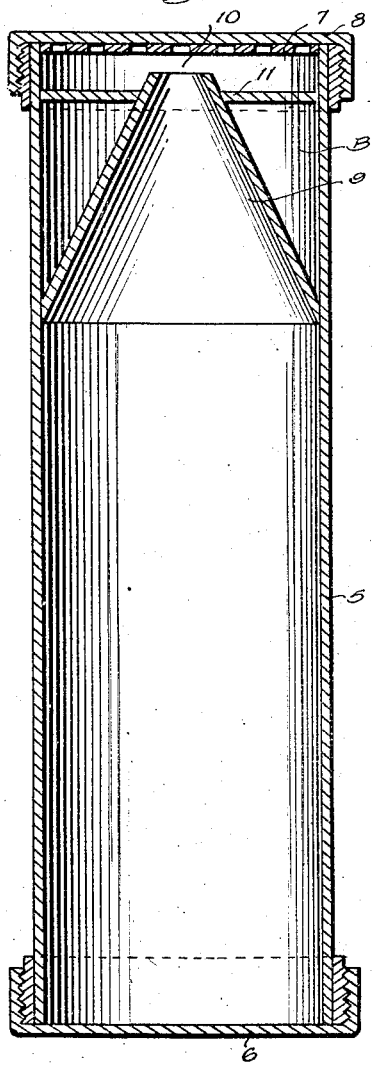
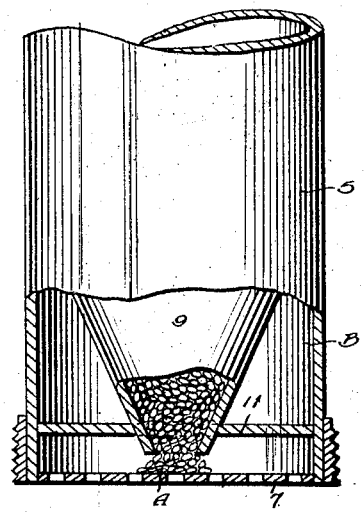
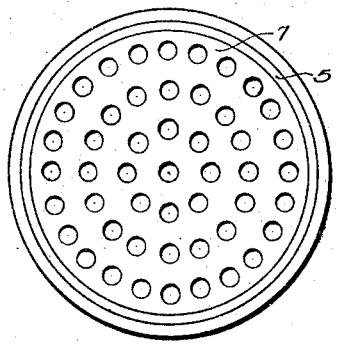
WITNESSES
INVENTOR
Rudolph L. Roehrs.
BY
ATTORNEYS Patented Oct. 20, 1925.

1,558,396

UNITED STATES PATENT OFFICE.

RUDOLPH LIENAU ROEHRS, OF RUTHERFORD, NEW JERSEY.

GRASS-SEED CONTAINER.

Application filed November 8, 1923. Serial No. 673,622.

*To all whom it may concern:*

Be it known that I, RUDOLPH LIENAU ROEHRS, a citizen of the United States, and a resident of Rutherford, in the county of Bergen and State of New Jersey, have invented a new and Improved Grass-Seed Container, of which the following is a full, clear, and exact description.

The present invention relates to new and useful improvements in containers, and it pertains more particularly to a device of this character especially adapted for carrying grass and similar seed.

It is one of the objects of the invention to provide a container for seed which may be used in the first instance as a sales package, and, secondly, as a means for broadcasting or sowing the seed.

It is a further object of the invention to provide a suitable discharge opening for the grass seed in order that the proper broadcasting thereof may be had.

It is a further object of the invention to provide delivery means for delivering the seed to the discharge of the container in such a manner as to prevent waste of the seed therein contained.

With the above and other objects in view, reference is had to the accompanying drawings, in which—

Figure 1 is a longitudinal sectional view of a container constructed in accordance with the present invention;

Fig. 2 is a detail sectional view showing the action of the seed-delivering means;

Fig. 3 is a plan view of the seed discharge.

Referring more particularly to the drawings, the device comprises a tubular member 5, which although preferably circular in cross sectional form, may be of any desired shape. This tubular member 5 has one of its ends closed by means of a screwcap 6, and mounted in the other end there is a perforated end wall 7. This perforated end wall 7 is closed by a second screwthreaded cap 8, which is adapted to receive this end of the container 5. Mounted within the container bear the last-mentioned end, there is a frusto-conical member 9, and the contracted end of said frusto-conical member 9 is substantially centrally-disposed with respect to the perforated end wall 7, and spaced slightly therefrom as designated by the reference numeral 10. Surrounding the contracted end of the frusto-conical member 9 and slightly spaced with respect to the contracted end thereof, there is a guard plate 11, and the purpose of this guard plate will be hereinafter referred to.

The device operates in the following manner:

The cap 8 is attached to the tubular member 5, the cap 6 being removed, and through the opening furnished by the removal of the cap 6, the device is filled with suitable seed, such, for example, as grass seed. After it has been filled, the cap 6 is replaced and the device is ready for use.

When the device is inverted, as shown in Fig. 2, the seed is delivered by means of the frusto-conical member 9 to the perforated end wall 7. If the device is held stationary, however, the seed will clog the contracted discharge end of the frusto-conical member 9, as indicated by the reference character A in Fig. 2, and the seed will not continue to flow therethrough. If, however, the device is shook in a lateral direction, the seed clogging the contracted end of the frusto-conical member 9 will be disposed laterally upon the perforated end wall 7 and will be discharged therethrough. When the device is returned to normal position, the seed falls down the guard plate 11 and is prevented from passing downwardly around the frusto-conical member 9 in the space designated by the reference character B in the drawings.

It is intended that the device be used in the first instance as a sales package, and when both the caps 6 and 8 are in place the container may be transported without discharge or waste of the seeds contained therein, and the operator need only remove the cap 8 in order to broadcast or sow the seed.

The device is capable of use as a planter or a broadcaster generally, since it may be re-filled at any time by simply removing the cap 6 thereof.

From the foregoing it is apparent that the present invention provides a new and improved package especially adapted for containing seed, which package serves as a sales package, and, at the same time, constitutes a means by which the seed may be sown or broadcasted.

What is claimed is:

A container for grass seed and the like comprising a tubular member, a perforated end wall constituting a discharge for said tubular member, a tapered hollow member mounted within said tubular member and constituting means for delivering the contents of the tubular member to the perforated discharge member, the open end of said tapered hollow member being spaced from the perforated discharge member, and a guard plate spaced from the perforated discharge member and surrounding the tapered hollow member, and through which the small end of the tapered hollow member projects.

RUDOLPH LIENAU ROEHRS.